(12) United States Patent (10) Patent No.: US 7,707,210 B2
Stefik et al. (45) Date of Patent: Apr. 27, 2010

(54) SYSTEM AND METHOD FOR MULTI-DIMENSIONAL FORAGING AND RETRIEVAL OF DOCUMENTS

(75) Inventors: Mark J. Stefik, Portola Valley, CA (US); Alexander B. Brawer, Berne (CH)

(73) Assignee: Xerox Corporation, Norwalk, CT (US)

( * ) Notice: Subject to any disclaimer, the term of this patent is extended or adjusted under 35 U.S.C. 154(b) by 657 days.

(21) Appl. No.: 10/739,810

(22) Filed: Dec. 18, 2003

(65) Prior Publication Data

US 2005/0138056 A1 Jun. 23, 2005

(51) Int. Cl.
*G06F 7/00* (2006.01)
*G06F 17/30* (2006.01)

(52) U.S. Cl. ........................................ 707/736
(58) Field of Classification Search ............... 707/5, 707/9, 101, 10, 736; 704/9
See application file for complete search history.

(56) References Cited

U.S. PATENT DOCUMENTS

| | | | | |
|---|---|---|---|---|
| 5,204,812 | A * | 4/1993 | Kasiraj et al. ............. | 707/9 |
| 5,418,946 | A | 5/1995 | Mori | |
| 5,483,650 | A | 1/1996 | Pedersen et al. | |
| 5,675,819 | A | 10/1997 | Schuetze | |
| 5,870,741 | A | 2/1999 | Kawabe et al. | |
| 5,895,470 | A | 4/1999 | Pirolli et al. | |
| 6,038,574 | A | 3/2000 | Pitkow et al. | |
| 6,098,064 | A | 8/2000 | Pirolli et al. | |
| 6,182,091 | B1 | 1/2001 | Pitkow et al. | |
| 6,286,018 | B1 | 9/2001 | Pitkow et al. | |
| 6,326,965 | B1 | 12/2001 | Castelli et al. | |
| 6,430,575 | B1 | 8/2002 | Dourish et al. | |
| 6,457,028 | B1 | 9/2002 | Pitkow et al. | |
| 6,460,036 | B1 * | 10/2002 | Herz ........................ | 707/10 |
| 7,089,238 | B1 * | 8/2006 | Davis et al. ............... | 707/5 |
| 7,165,024 | B2 * | 1/2007 | Glover et al. ............. | 704/9 |
| 2003/0033300 | A1 * | 2/2003 | Bergman et al. .......... | 707/5 |

* cited by examiner

*Primary Examiner*—Etienne P LeRoux
*Assistant Examiner*—Chelcie Daye
(74) *Attorney, Agent, or Firm*—Fay Sharpe LLP

(57) ABSTRACT

A method for interactive foraging for documents within a corpus of documents includes forming a working set of documents which are a subset of the corpus of documents. A visual representation of the working set and a portion of the corpus other than the working set are generated, and a visual representation of a retrieval boundary, between the working set and the portion of the corpus other than the working set, is presented. A further embodiment provides a system for interactive foraging of documents within a corpus of documents which includes, a visualization foraging subsystem, and an analytical repository containing a plurality of documents. The documents have been analyzed and are provided with associated dimensional data. A search mechanism of the visualization foraging subsystem is configured to form a working set of documents from the corpus of documents. A display device displays the working set and a portion of the corpus other than the working set, and a retrieval boundary is displayed on the display distinguishing between documents in the working set and the displayed documents of the corpus other than the working set.

24 Claims, 7 Drawing Sheets

SYSTEM AND METHOD FOR MULTI-DIMENSIONAL FORAGING AND RETRIEVAL OF DOCUMENTS

BACKGROUND OF THE INVENTION

The present application is directed to information retrieval, and more particularly to interactive systems for foraging and retrieval of documents and information.

The term retrieval used in association with information and/or document retrieval is commonly understood to be related to a system for locating or making accessible or known, information, documents, or citation data for documents.

The term foraging when used in association with information and/or document foraging is intended to emphasize the process by which a person interacts with an information system—searching, browsing, sampling, reading, and so on—when working to identify and acquire information.

These terms have overlapping concepts, and effective information systems should support both foraging and retrieval. Although retrieval is more concerned with the actual obtaining of documents or information, and foraging is more concerned with the process by which the searching for the documents or information occurs, since they do contain overlapping concepts, at times in the following discussion these terms are used to refer to related activities.

Many types of information retrieval systems are in existence. Often they take the form of search engines configured to search across numerous document systems and/or databases connected together via an electronic data communication network such as the internet, or local and/or privately controlled networks.

Existing information retrieval systems (e.g. search engines) commonly undertake the document retrieval task via what may be expressed by a linguist as a "bag of words" approach. Under this analogy, a document or web page is broken into individual words, and these words are then placed into a bag for purposes of generating matches. A user specifies a search request as a query made up of search terms. These search terms typically include several individual words. The search engine will undertake a search of the document database and will identify all of the documents whose "bags" contain these search terms. The search engine then returns a collection of text snippets from the matching documents, and ranks the documents in accordance with a relevancy determination. Individual search engines may identify or rank sources of information in accordance with differing standards, influencing the returned documents and their ranking. For example, a search engine may be designed to give precedence to those snippets whose documents include all of the search terms. Other designs may give presence to the most popular or authoritative documents based on an analysis of how frequently the documents are cited by the links to other documents. As a refinement a search engine may permit the selected search terms to be connected via boolean-type operators, a distance and/or order between the words.

The retrieval of information is commonly considered to involve two distinct fields.

The first field is information retrieval, which addresses the case where the information is organized in terms of documents. Examples include searches within the World Wide Web and/or digital libraries. In this field, there is an assumption that interesting information is stored as content of documents and is represented in terms of language, graphics or pictures. Automated natural language processing or human reading is used to classify documents or to extract information from the documents. In this field, documents are retrieved in several ways, such as by key word matching of contents, browsing and selection from manually constructed hierarchies, or matching of meta-data such as authors and publication dates. Thus, retrieval of documents in this field of pursuit, focuses on identifying and retrieving relevant documents.

The second field is related to database management, and addresses a situation where the information is organized in terms of tables or databases. A well-known approach to organizing information in databases is through the use of relational database structures. This field assumes interesting information is stored in databases, and is represented formally and consistently in terms of numbers and symbols in fields of records organized typically in tables. Information may be retrieved by specifying values for some of the fields of records and then returning the records whose fields match. Retrieval in this area, therefore, focuses on fetching and combining data from the records.

One particular approach of document retrieval, is the Scatter/Gather approach, Peter Pirolli, Patricia Schank, Marti Hearst and Christine Diehl, 1996, Scatter/Gather Browsing Communicates the Topic Structure of a Very Large Text Collection, *Proceedings of the ACM Conference on Human Factors in Computing Systems* (CHI 96), 213-220, New York: ACM Press., which uses document clustering to automatically scatter a document collection into a smaller number of coherent document groups. It then presents short summaries to the user. Using the summaries, the user selects one or more of the groups for further study. The system then gathers these groups together, by a union operation, to form a sub-collection. The clustering operation is again used to scatter the sub-collection into a new set of document groups, which are then presented to the user. The groups become smaller with each iteration.

A variant of Scatter/Gather is Multi-Modal Scatter/Gather (MMSG), Francine Chen, Ullas Gargi, Les Niles, and Hinrich Sch tze, 1999, Multi-Modal Browsing of Images in Web Documents, *Proceedings of the SPIE Conference on Document Recognition and Retrieval*. This process has primarily been used for browsing of images. MMSG extends Scatter/Gather in its use of features in different spaces, that is, different modalities. In MMSG, users browse a collection based on iteratively specifying a feature, which is then used for clustering to form partitions. An expand operation may add images or clusters to a current set, based on similarity in one feature dimension.

A further approach is known as a SenseMaker system, Michelle Q. Wang Baldonado and Terry Winograd, 1997, SenseMaker: An Information-Exploration Interface Supporting the Contextual Evolution of a User's Interests, *Proceedings of the ACM Conference on Human Factors in Computing Systems* (CHI 97), 11-18, New York: ACM Press, which supports users in information exploration and interactively organizing document collections around contextual dimensions. SenseMaker provides a single interface for viewing heterogeneous collections for multiple sources. It enables users to view a collection from a variety of perspectives, such as according to author or topical units. It provides two hybrid strategies for assisting the information seeker: structure-based searching and structure-based filtering. In structure-based searching, SenseMaker users extend document collections by formulating queries that characterize their content and then add documents from the additional sources that match those queries. Structure-based filtering allows a user to limit a collection to sets that a user has selected according to certain properties.

Yet another example of document retrieval is known as the Presto system Paul Dourish, W. Keith Edwards, Anthony LaMarca and Michael Salisbury, 1999, Presto: An Experimental Architecture for Fluid Interactive Document Spaces, *ACM Transactions on Computer-Human Interaction,* 6(2). Presto is intended to provide an alternative to hierarchies of folders (or directories) for organizing collections of documents. It is implemented for e-mail collections and document collections. A concept of this system is that documents could be assigned properties and retrieved according to property values. For example, author could be a property, and Joe Smith would be a value for the author property. The values associated with the properties are computed by document services. Presto also provides a means for assigning properties to collections. The Presto process further provides a means for specifying documents to be included in a collection according to three components: a query, an inclusion list and an exclusion list. The query defines which documents are wanted according to values of properties. In other words, all documents matching the query at any given moment are members of the collection. The inclusion and exclusion list then serve to modify the query. In the user interface, documents are added to the inclusion list by dragging them to the collection, and are removed by dragging them out of the collection.

A further system is called a Dynamic Query system Ben Shneiderman, 1994, Dynamic Queries for Visual Information Seeking, *IEEE Software,* 111(6), pp. 70-77, which is directed to manipulation of interfaces to databases. Typically, there is a single display of data and a set of controls, such as sliders, which function as query controls that can be manipulated to determine the selection of data to be retrieved. A goal of a Dynamic Query system is defined as, giving a visual presentation of a query's components, provide a visual presentation of results, provide rapid, incremental and reversible control of a query, select information of interest by pointing rather than typing and provide immediate and continuous feedback to a user about the results of changes to the query.

It is considered each of the mentioned and other existing processes and/or systems do not describe a system and/or device which permits sufficient robust conversational capability within the exploratory information retrieval process.

SUMMARY OF THE INVENTION

A method for interactive foraging for documents within a corpus of documents includes forming a working set of documents which are a subset of the corpus. A visual representation of the working set and a portion of the corpus other than the working set are generated, and a visual representation of a retrieval boundary, between the working set and the portion of the corpus other than the working set, is presented. A further embodiment provides a system for interactive foraging of documents within a corpus which includes, a visualization foraging subsystem, and an analytical repository containing a plurality of documents which have been analyzed and are provided with associated dimensional data. A search mechanism of the visualization foraging subsystem is configured to form a working set of documents from the corpus of documents. A display device displays the working set and a portion of the corpus other than the working set, and a retrieval boundary is displayed on the display distinguishing between documents in the working set and the displayed documents of the corpus other than the working set.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
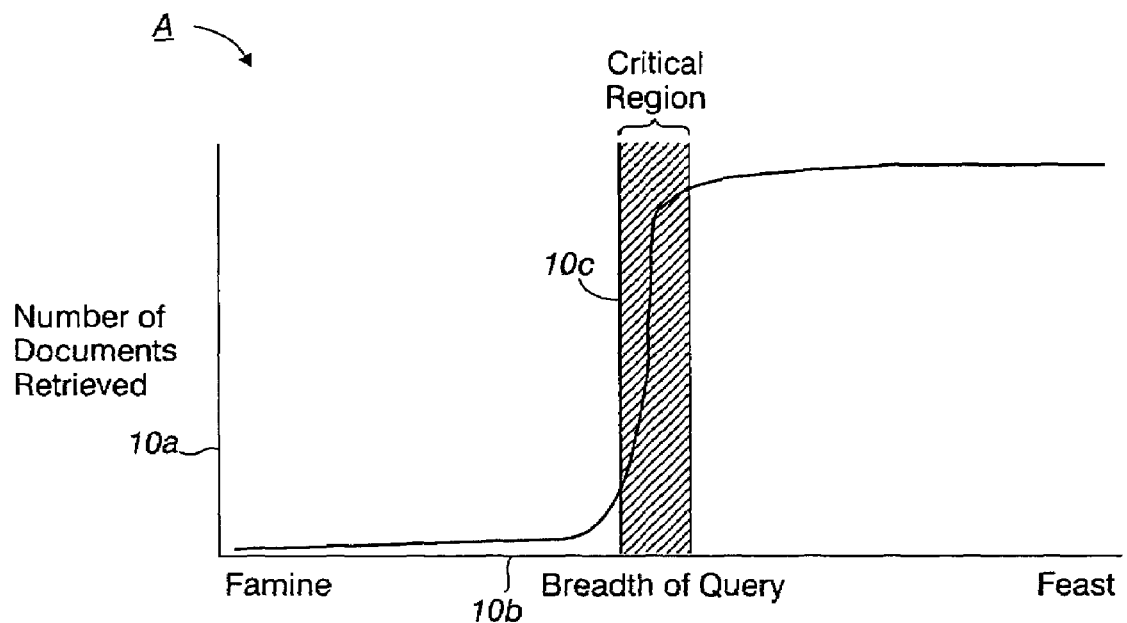
FIG. 1 illustrates a phase shift in information retrieval for existing search engines.

In describing and claiming the present concepts, the following terminology will be used in accordance with the definitions as set out below.

The term "corpus" as used herein refers to a collection of documents wherein processes such as web crawlers and/or other systems may regularly add documents to the corpus.

The term "degree-of-interest" (DOI) function is used herein to identify processes to determine which neighbor documents are of the greatest interest so that they may be represented visually in a panel. For example, a panel based on a citation analysis would have a degree-of-interest function that computes a neighbor distance using factors such as the amount of co-citation, co-mentioning of documents, and so on. A degree-of-interest function acts to estimate how much interest something is to a user. Degree-of-interest functions are often based on distance functions, so that if a user is interested in an item A, they are likely to be interested in other items that are "near" to A.

The term "dimension" refers to structured data about the document. Dimensional data may be assigned or derived. A specific case of dimensional data is when the salient data can be automatically derived. For example, one type of dimensional data may be "topic", i.e., a symbolic representation of the topic or topics discussed in a document. The topic example is simply one example of the multitude of dimensional data which may be defined.

"Documents" are defined herein as the format in which information is contained and for which foraging and retrieval operations are undertaken. Documents may be in the form of files and in some document formats, such as web pages, one document requires several files. Documents may be stored in any convenient digital form, such as text files, word files, slide formats, image files that have been OCR'd, etc. Generally, collections of information, potentially multimedia, but generally containing language as text, are the documents being sought. They may take the form of separate files accessed by an operating system, strings stored in databases, or other document storage mechanisms.

The term "document set" is intended to refer to those documents which may be represented by a token, which may be used to represent a plurality of documents of a particular type. Each panel may have its own procedure for dividing documents into document sets according to a value for the corresponding dimension. In a simplest case, a document set may be defined as a set of documents (usually of the working set and/or neighbors) that have the same value for the data associated with the dimension. For example, a document set in a genre dimension could be the set of all documents in the same genre.

The term "distance function" is used in the following to represent a process to determine the nearness of different points (i.e., documents) within a working set. For example, in a temporal dimension, the distance would be a time difference. In a topic dimension, it would be a measure of how far apart the topics.

The terms "exclusion constraints" and "inclusion constraints" are conversational acts used herein to reference explicit visual representations of documents which have been explicitly included or explicitly excluded by a user during foraging operations, such as by spiraling-in and spiraling-out operations. The inclusion and exclusion constraints show what documents are or are not included in a working set.

The term "files" as used herein is a format of information which may be used to form a document.

In the following discussion, the term "neighbors" are documents visually presented to a user, but those which exist outside of a working set.

A "panel" is a display arrangement which provides a visual representation of a working set and neighbors within a dimensional space in terms of degree-of-interest or other similar metric. The panel represents a distinct dimension or combination of dimensions of documents.

The term "peeking" is a conversational act which a user to temporarily accept a new working set for review.

The term "property" as used herein may be interchangeably used with dimension representing structured data of the document.

The term "retrieval boundary" is used in the following discussion to describe a border between documents included within a working set (i.e., chosen documents) and neighbors of the working set documents (i.e., documents not chosen). The retrieval boundary is intended to support a sense of visual orientation to not only show the user what information has been gathered, but also a comprehensible representation of information not yet chosen or actively excluded.

The term "seeding" as used herein is a conversational act between the user and the system which can be carried out by directly manipulating tokens. In one embodiment, a simple gesture for indicating a seeding operation is selecting, dragging and dropping a token into a seeding zone. The seeding operation is a way of creating a working set or adding to an existing set.

The term "spiraling-in" refers to a process of narrowing a set of documents, to eliminate those which are not relevant or interesting to a user. Spiraling-in scans information and recognizes some parts of it as more germane than others. Such recognition may be iterative, where a user may initiate foraging with a query, or, alternatively, begin foraging from the entire corpus and spiral-in to begin limiting the working set to documents of interest.

The term "spiraling-out" as used herein refers to an opposite process from the "spiraling-in" process, where a user may broaden the set of documents to find ones not included in a given set. A spiraling-out process provides a tailored map of the information space showing what else is available; such as books near a particular book in a library stack.

The term "token" (or icon) is used in the following discussion as a name, label or image to represent a document or set of documents in a panel. A panel may use its own specific process to compute names, labels or images, or in some cases, the names, labels or images may be manually assigned. Still further, they may be computed automatically as a type of summary or description of a particular document set. Additional information about the document set, such as its size or defining characteristics may be learned by an appropriate gesture, for example, letting a cursor dwell over a token may bring up a summary of that set.

The term "working set" are those documents in the corpus which are actively within a retrieval boundary generated by a user. Documents of the tokens representing the documents of a working set may be displayed on a panel providing a visual representation of the documents/token and their relationship to each other for viewing by a user.

Having provided the forgoing definitions, a discussion for the present application will now be described.

The process to be described is directed to the foraging and retrieval of information located in documents, and these documents may be stored as described above or in any convenient digital form, such as text files, Word files, slide formats, image files which have been acquired by an OCR process or other format. As previously mentioned, documents can be in the form of files, and in some document formats, like web pages, one document may require several files. Further, the information being sought may be collections of information, potentially in the form of multimedia, for example, containing language as the text being sought. It may also take the form of separate files accessed by an operation system, strings stored in databases, or any other document storage approach.

Existing search and retrieval systems submit one or a number of search terms to a search engine commonly resulting in the retrieval of hundreds or thousands of candidate documents associated with the submitted words, from a searched collection or corpus of documents. The collection or corpus is understood to contain documents which have been analyzed and classified in some manner, are stored, for example, on servers which may be accessed by the search engine. In this way the documents are accessible to the search engine. The analysis and classification may be undertaken manually by an individual or automatically by linguistic, analytic or other analysis or classification engines. These existing search engines are primarily designed to seek and return popular and robustly represented information. Therefore, such systems are based on a robust representation assumption and a popular meaning assumption.

The robust representation assumption states that popular information will be represented in different ways in multiple documents such as pages of the web. It is perceived that different individuals will nevertheless draft documents containing the same information using variations in terms and phrasings. The variations of phrasing increase the odds that a user's particular combination of search terms will match the index terms for a page somewhere in the searched database. Thus the robust representation assumption simplifies the work of a search engine because it sidesteps the need to generate alternative phrasings in the search of information.

The popular meaning assumption states that the most popular documents (e.g. web pages) matching the given search terms will contain information corresponding to the searcher's intended meaning. For example, the term "Mustang" might refer to a kind of automobile or a horse. The popular meaning assumption selects one particular meaning among the variations of meanings for the search terms as they are used in the corpus. Implicitly, it selects the meaning of the terms as used in the most popular documents. The popular meaning assumption simplifies the work of a search engine as it sidesteps the problem that different arrangements of the same words can have radically different meanings.

The robust representation assumption reduces false negatives in retrieval, and the popular meaning assumption reduces false positives. False negatives (misses) arise when search terms differ from those in a document, causing a simple word match to fail and documents not to be found. False positives arise when simple word matches would return documents which contain the search terms but whose meaning does not correspond to the user's intent.

Although useful, the robust representation and popularity assumptions do not hold true across all information-seeking situations. Nor do they hold for privately or personally assembled document collections. For this reason, term-based search processes (in contrast with multi-dimensional foraging of the present application) are more likely to yield less useful results in these situations. Particularly, when a user is seeking rare or specific information, whether it is on the World Wide Web, in a patent database, in an on-line library of research articles, a corporate document collection or other database information storage system, use of the robust representation and/or popularity assumptions results in a feast or famine scenario.

FIG. 1 provides an illustration of the feast/famine concept. For graph A, vertical axis 10a represents the number of documents retrieved by a search, and horizontal axis 10b represents the breadth of the query, which is a measure of the specificity of the query. For example, "maple tree" is more specific than "tree," which is more specific than "tree or shrub." The more specific a query, the more requirements must be satisfied for a document to matter and be returned.

On the vertical axis the number of retrieved documents increases the further away from the origin. On the horizontal axis, queries nearer the origin are more specific than those farther from the origin. When the query is broad, a feast situation exists, and as the query becomes more specific, a dramatic drop in the information retrieved eventually occurs. Critical region 10c over which this phase shift occurs is a region of chaos, where many kinds of documents and many kinds of information get mixed together. This mixing of information exists also in the feast region, and is where the user becomes overwhelmed by the amount of documents returned, and unable to determine which documents may be relevant. On the other hand in the famine region insufficient documents are retrieved for the user.

This mixing or chaos represents a breakdown that can occur in the interaction between a user and a search system. A search engine is not capable of comprehending what the user requires, and therefore includes whatever documents are responsive to the search. The user is also confused, being unable to express the exact requirements they are seeking.

The feast and famine scenario is a symptom of inadequate controls. Particularly, the system does not provide sufficiently informative choices for governing foraging, sensitivity of control for making the choices, or comprehensible feedback about the consequences of choices made so far.

This problem is fundamental and is rooted in the traditional metrics that have been used to create existing search engines, which rely on concepts of precision and recall. Precision is a measure of whether documents which are returned by a search engine are relevant, and recall is a measure of whether all of the relevant documents are found. Both of these measurements are defined relative to a given collection of documents, a given query and the documents returned.

The root of the difficulty is a system problem. The system being measured by precision and recall includes the search engine, the corpus and the query, but not the user. However, it is fundamental that users who are seeking information, recognize information, browse and sample it when it is found. The key to understanding the deficiencies of the precision and recall concepts is that a user has limitations in knowing what information might be useful before seeing what information is available. This makes it difficult for the user to set comprehensible maps to what is available and clear controls for making choices, and clear feedback about the effects of their choices. To model a user's participation in a system requires looking beyond concepts of information retrieval and to concepts of sense making and information foraging.

Thus, the challenge which is presented is not only about finding information in a large corpus, be it rare or non-rare. It is also about working with unexpressed information needs of users who do not know exactly how to express what they want, and therefore they require more guidance to understand what is available.

Figure 2:
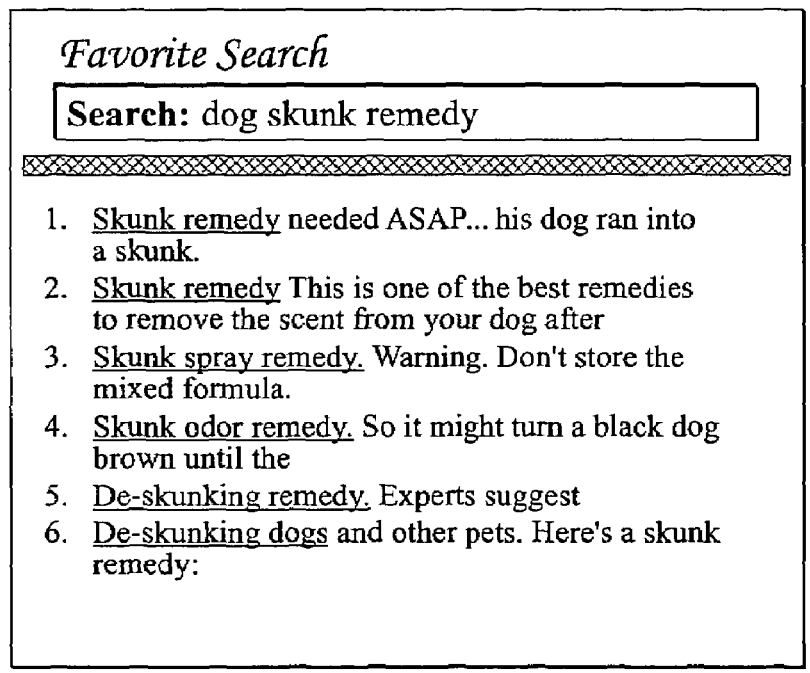
FIG. 2 depicts a typical interface for retrieval of existing search engines.

Traditional search systems having a typical retrieval interface 18 such as shown in FIG. 2, will return and rank listed documents matching the search terms. This type of interface provides minimal ability or affordances to permit a user reviewing search results to browse and explore for other information which may be nearby or relevant, but which they do not know how to find. Thus, retrieval interface 12 of FIG. 2 provides users with no ability to find things that they did not mention in the query and did not know existed, but which may be relevant to what they ultimately are seeking.

Concepts recited in this application are concerned with providing a foraging and retrieval mechanism where there is a conversation about spiraling-in and spiraling-out from a working set of documents. This conversation is framed in terms of dimensions about the documents which are precomputed and visually presented.

Figure 3:
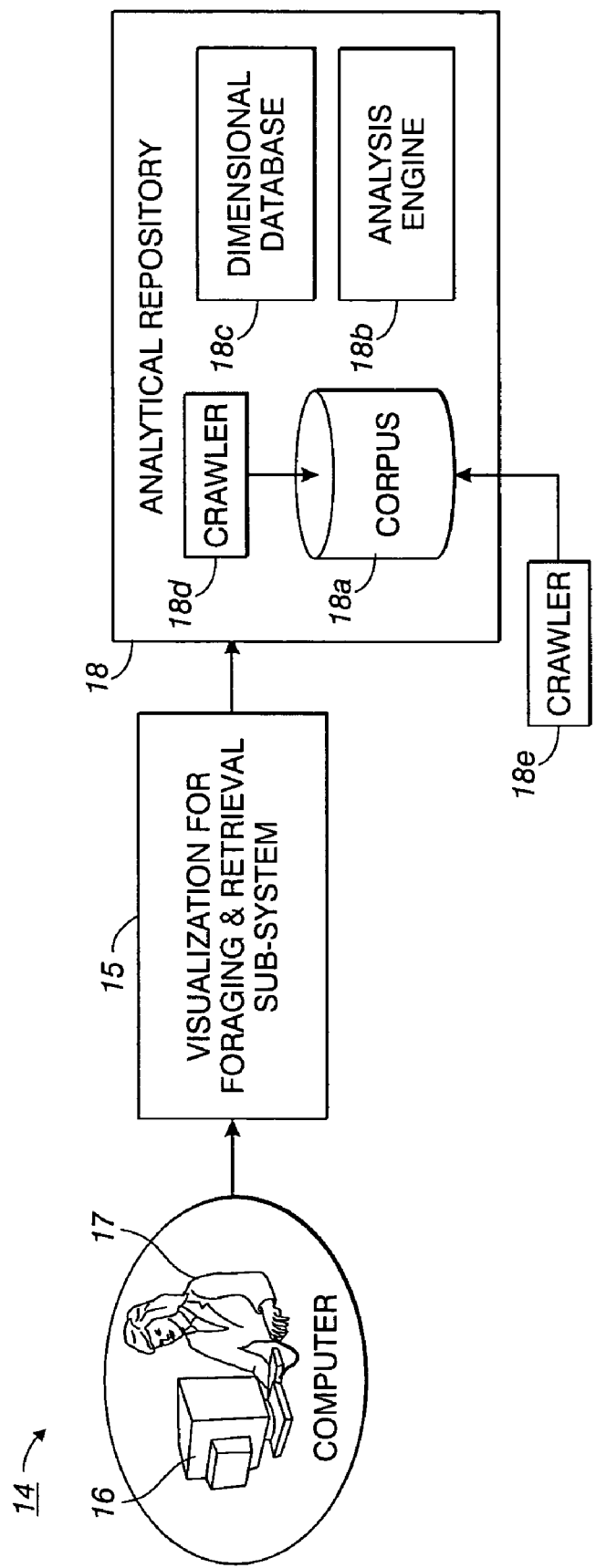
FIG. 3 is a diagram of a foraging and retrieval subsystem interfaced to computer system operated by a user seeking information and a storage environment containing information.

As an overview of the present concepts, in one embodiment as depicted in FIG. 3, a communication system 14 includes a foraging and retrieval subsystem 15 configured to interface between a computing device 16 operated by a user 17, and an analytic repository 18. The foraging and retrieval subsystem 15 assists a user in collecting a set of potentially interesting documents. The foraging and retrieval subsystem 15 is in one embodiment a visual foraging and/or retrieval subsystem which supplies its output to an output device, commonly a display, but which may also be a monitor of the computer device 16. The documents of the analytical repository 18 are provided as corpus 18a, and have been analyzed by various analysis engines 18b, such that dimension data may be associated with the documents via a dimensional database 18c. The analytic repository becomes aware of documents by either document identifier software 18d, such as a web crawler, which investigates documents within the corpus 18a, or it becomes aware of such documents by incorporating a web crawler or other document identification software 18e to crawl or otherwise interpret documents as they are incorporated into the corpus 18a.

Thus, several elements are valuable in supporting efficient foraging behavior, including an analyzed collection of documents, such as corpus 18a stored in analytic repository 18. At least one and preferably a suite of analysis programs, as in the form of analysis engines 18b, are provided for automatically extracting dimensional data regarding documents. The analysis engine 18b may be designed so the programs are automatically run on documents when they are added to the analytical repository 18. The dimensional database 18c is preferably a high performance database for storing dimensional data for rapid access during document foraging.

The visualization foraging and retrieval subsystem 15 will provide a display a working set of documents collected from the corpus, where the working set is presented to the user, in context, in each of a plurality of open-dimensional displays, such as panels. The displays may be configured to show the documents within certain categories or abstractions (e.g., topics, sub-topics, etc.). The display will also provide a visualization of neighbors in the dimensional space in terms of degree of interest (typically a similarity or distance metric). The visualization of the neighbors are provided in terms of indicating whether the neighbors are ruled in or out of a working set according to user interactions.

The system may be a single or multi-dimensional document foraging and retrieval system which supports the collecting of these documents by supporting efficient foraging behavior through interaction with multiple "dimensional" views of the documents.

As previously defined, a "dimension" is a property of a document and may be considered structured data about the document. Dimensional data may be assigned or derived. An important case is when the salient data can be automatically derived. For example, one kind of dimensional data would be "topic", i.e., a symbolic representation of the topic or topics discussed in a document. Another example would be "reading level", i.e., classifying if the documents are directed to a child, young adult or adult. Another might be a metric of "authoritativeness", i.e., is the author an expert. It is to be understood the above are simply examples of dimensional data, and numerous other types may also be used.

Some dimensions (or properties) may be derived from linguistic analysis. A fact extraction process may be used to extract and compare facts from the content of documents. For example, a fact pattern could be defined for recognizing "corporate mergers in the United States of America." A dimension would indicate whether the document contains any sentences that match the pattern "corporate mergers in the United States of America" or "corporate mergers in the United States of America during the 1990s." In this design a set of desired facts may be imported into a fact template. A number of such fact templates can then be constructed, with a viewer being used to permit a user to identify which documents contain sentences matching the fact templates.

Additional dimensions may be derived across documents and assembled about information objects in the documents. For example, extracted data about people could include links to publications, links to co-authors, links to home institutions, and so on. While such data are not about documents per se, they may play a valuable role in guiding foraging behavior.

As the foraging process moves forward, the working set evolves—sometimes expanding (spiral-out), sometimes shrinking (spiral-in).

In the following discussion, described are visual presentations created for the document dimensions. We refer to these presentations as "panels." In the simplest case, a panel presents data for a single (dimensions), although in some cases it makes sense to combine multiple in a panel. For example, an "author date" panel could group documents on a timeline. An author panel might group documents according to the authors—either alphabetically or arranged according to an institution.

Each panel shows which documents are in the working set, and also which documents are in the corpus. Indications could also be given of which documents in the corpus are deliberately excluded (by user request) from the working set. Documents in the panels may be represented by a visual token. In the extreme case, they may be represented by very small tokens such as a dot or a line. In other cases, an appropriate token may be a label or icon used to represent a document or a set of documents.

Every panel has a kind of "degree-of-interest" function which is used to govern how much space is allocated to the representations of documents. All of the panels reflect the same working set, situated in the same universal set. When users exclude documents using one panel, the working set changes and all of the panels are updated.

Figure 4:
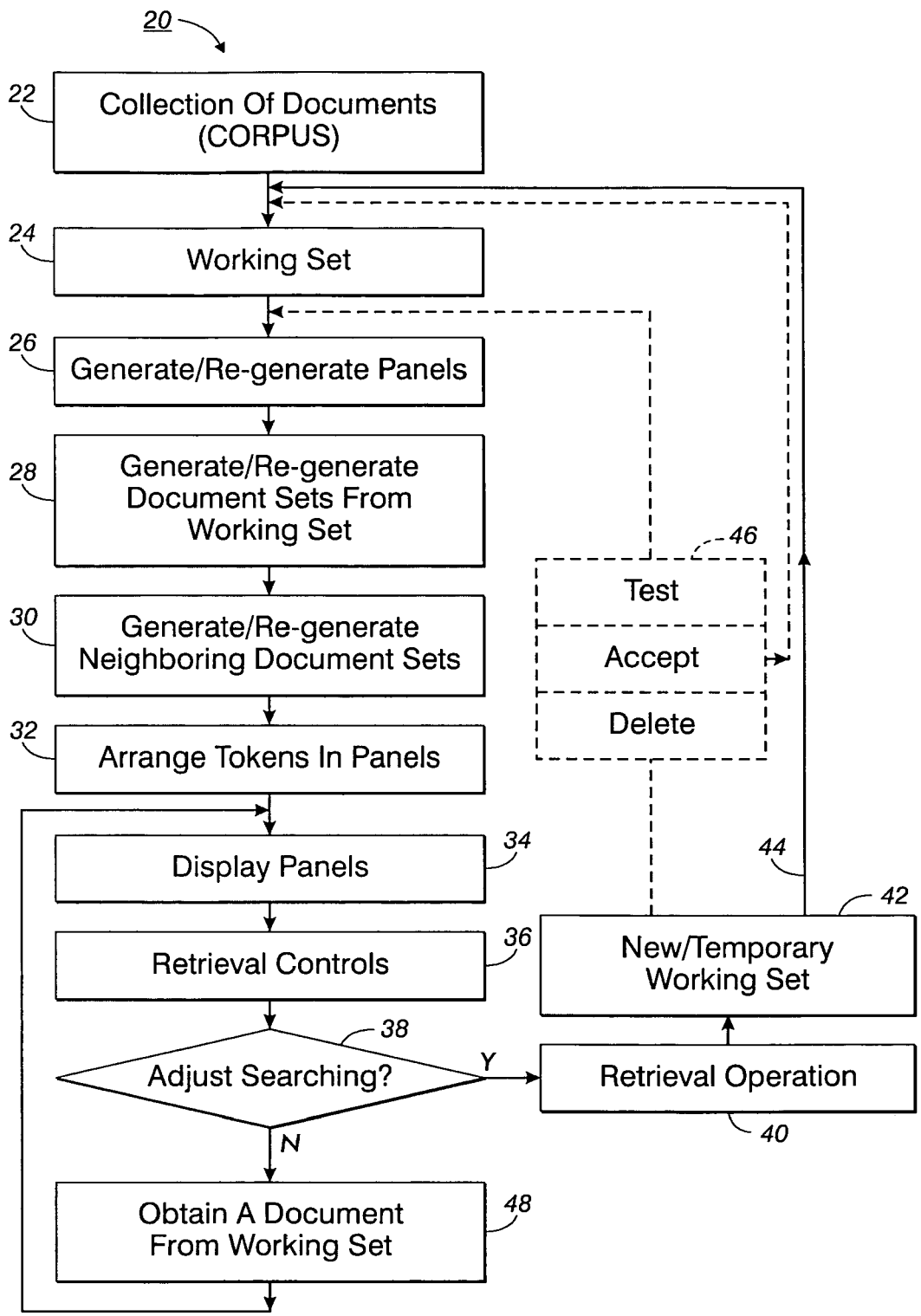
FIG. 4 sets forth a process flow according to the concepts of the present application.

With attention to FIG. 4, illustrated is a process in accordance with embodiments of the present application. Process flow 20 incorporates having a repository for a corpus to be searched (step 22). The documents have a number of different properties or dimensions. The repository may be documents located on servers or storage devices on the internet, or other local public or private networks.

Document dimensions are derived from document content, meta-data (such as author, publisher, publication date, etc.), as well as any other data which identifies, or otherwise categorizes, a document. At times, such properties or dimensions may be associated with a document by attaching tags to the document, or by giving an indication that a document is in a particular database of other documents of a particular type. It is understood the document properties may also be implemented by computational procedures that analyze the contents of documents and any related source of information about them. The process of computing property values may occur in real time or prior to a foraging operation.

From this collection of documents, a working set (step 24) is derived, which may be thought of as a subset of the documents of the corpus. Once this working set of documents is obtained, the process moves to step 26 where at least one and preferably a plurality of panels are designated. The panels are representative of a distinct dimension or combination of dimensions of documents. Next, document sets are generated corresponding to the panels (step 28). The document sets may, in one embodiment be represented as tokens or icons. By this design, tokens representing both document sets from the working set and neighboring document sets will be displayed in a panel.

Tokens and/or the document sets are stored in a linked association with each other. This may be accomplished via the use of a look-up table and/or pointers, by storing a relational database or any other process which results in an action made in one panel on a token or document set being reflected in other panels also having related tokens or document sets.

The computation of what document sets to include in a panel begins with the working set (step 24 of FIG. 4). For each panel, the process of deciding what to include begins with a review of documents within the current working set and collecting document sets corresponding to the panel's dimension or combination of dimensions. Thereafter the collection of document sets is extended to include neighbors (step 30). The neighbors are nearby document sets determined using a Degree of Interest (DOI) function that is specific to a dimension(s) of a particular panel. By use of the DOI function, neighbors of the greatest interest are represented in the panel. The document sets from the working set and the neighbor document sets represented as tokens, are arranged in relationship to each other within a panel. The generated panels (with tokens) are then displayed to a user via a multi-dimensional retrieval interface (step 34).

As previously mentioned, a token or icon is a name, label or image used to represent a document set in a panel. Each panel may use its own specific process for computing names, labels or images. In some cases, the names, labels or images may be manually assigned. In others, they are computed automatically as a type of summary or description of that document set. Additional information about the document set, such as its size or defining characteristics may be learned by an appropriate gesture, for example, letting a cursor dwell over a token will bring up a summary of that set.

Tokens in the panel are also designed to indicate whether the document set is completely included in the working set, partially included in the working set, or not included in the working set. Using a visual transfer function on the tokens, for example, visual properties such as color coding, intensity, font, underlining, etc., may be used to present the state of the token to a user. For example, a token may be black to show that it is completely included in the working set, may be a blue token, to indicate that it is partially included (e.g., some of the search terms were found in these documents), and a gray token may indicate the documents in the document set are not included in the working set. Thus, in this case the gray token document set was generated as a "neighbor."

This visual transfer function is used for the generation of a retrieval boundary. As previously discussed, a concept to which the present application is directed is to provide a user with the ability to undertake foraging and exploratory retrieval of documents. Foraging takes place in the context of a corpus. A user foraging for and retrieving information in the corpus needs to be able to maintain an orientation in the corpus and to a retrieval boundary between documents chosen and documents not chosen. The visualization of the document sets described provides this retrieval boundary in an easy to comprehend display. The retrieval boundary supports a sense of orientation and shows the user not only what information has been gathered, but also a comprehensible representation of information not yet chosen or actively excluded. This user interface design illuminates the retrieval boundary in the corpus by showing the near-neighbor information via a designation distinctive from that which is presently within the working set where one distinctive designation may be the discussed visual transfer function. Having this information permits a user to determine whether there is information of more relevancy which they have not directly searched.

With continuing attention to FIG. 4, the system of this embodiment provides the user with incremental information retrieval controls (step 36). Using these controls, a user spirals-in and spirals-out in an incremental fashion to adjust the boundaries of their search.

Spiraling-in is a process of narrowing a set of documents, thereby eliminating those that are not relevant or interesting. Spiraling-in scans information and recognizes some parts of it as more germane than others. Such recognition is iterative. A user could initiate foraging with a query or, alternatively, begin foraging from the entire corpus and spiral-in to begin limiting the working set to documents of interest.

Spiraling-out is an opposite sort of process in which users want to broaden the set of returned documents to find ones not included in a given set. A user who is spiraling-out wants a tailored map of the information space showing what else is available. As an analogy, following links out from a found document is similar to beginning with an interesting book in a library stack and then searching the neighboring bookshelves for related information. Since the stacks in the libraries are organized by topic, neighboring books are likely to be of interest even though their titles or contents contain different words than those in the first book. Improving the efficiency of user performance in spiraling-out has little to do with precision and recall. Spiraling-out is useful when users wish to find documents and/or information that they did not mention in a query and did not know existed.

By spiraling-in and spiraling-out, users gain information control. Efficiency in spiraling-in or out is about information gained per unit of time. In step 36, the user is provided with the ability to spiral-in or spiral-out for each individual panel. Adjusting the retrieval boundaries, i.e., by performing a spiraling-in or spiraling-out operations, will be reflected in the visual display of the other associated panels.

When a user determines to undertake a retrieval operation such as a spiraling-in or spiraling-out operation ("y" of step 38), the system of FIG. 4 moves to a retrieval operation (step 40). This operation results in a change in the status of the existing working set, by the addition or removal of documents from the previously generated working set creating a new or temporary working set (step 42).

In one embodiment the system operates to automatically replace the previous working set with the new working set (line 44). However, in another embodiment the user may temporarily accept the new working set, for review (step 46, "Test"). If it is determined the new working set is appropriate, the user may replace or merge the new working set and previous working set (step 46, "Accept"). If it is determined to not use the new working set (step 46, "Delete") the process deletes the new working set and additional retrieval operations are available with the previous working set.

When a new working set is generated and/or accepted, steps 26-32 are undertaken to regenerate and/or reconfigure the panels to reflect the new working set. Thereafter, the reconfigured panels are displayed (step 34). It is noted the user has the ability to undertake repeated spiraling-in and spiraling-out operations.

The process described may be repeated until the refinement of the search desired by the user is obtained. The working set and/or any reconfigured or new working sets are then displayed for viewing by the user. When, at step 38 "n" the user determines there is a document of interest, the user may, as shown in step 48, retrieve the document for a more thorough investigation, printing, etc. Thereafter, the process returns to step 34 to permit additional incremental amendment of the search. Alternatively, the user may retrieve a snippet from the document, or a portion of the document, or a summary of the document.

As previously mentioned, many kinds of "dimensions" can be useful for information exploration over a corpus. From a computational perspective, dimensional data is cached information about the documents. From a utility perspective, there are many kinds possible dimensions that are useful for visualizing and controlling retrieval:

(i) Document genre is a dimension that sorts documents into the genres that the system recognizes, such as news stories, research articles, advertisements, amateur web pages, fictional stories, and so on. Documents can be assigned genre labels using information about the publication source for a document and an analysis of the writing style and content.

(ii) Level of reading difficulty is another dimension. Examples of reading levels are professional science, professional legal, popular news level, high school reading level, and grammar school level. Reading level can be computed from sentence structure and word usage.

(iii) Popularity is another kind of dimension. Popularity could be measured by link structure, citation structures, or usage data. A system could have multiple different "popularity" dimensions depending on different ways of measuring popularity.

(iv) Another dimension is the community of authorship and reference. Documents from known or reputable authors or cited by known experts in a field might be preferred over documents from less trusted sources.

(v) Topic is another dimension. The topic interface in FIG. 5 distinguishes two meanings of the word "Mustang"—one related to horses and one related to cars. It displays links to neighboring topics for cars such as car racing, car parts, auto shows, and so on.

Thus, some dimensions correspond to information that is typically characterized as document meta-data, such as author, publisher, and publication date. Other dimensions correspond to broad characterizations of the content, such as genre, reading level, and topic. Some of the dimensions provide crucial coupling between social communities and content. For example, clusters of interest in a social space (citation, co-citation, co-authoring, etc.) may be used to scope or understand clusters of interest in a topic classification space. Content analysis can also include linguistic processing beyond the usual types of bag of word indexing models. For example, it could include matching operations that take into account word sense, part of speech, synonyms, related metaphors, and so on. Finally, it is possible to have panels that reflect analyses of the user's own patterns of use, favorite topics, and so on. Dimensions can be combined to create new dimensions, such as combining co-authoring and co-citation data in a single composite metric. It is to be understood this is simply a short listing of possible dimensions, and it is to be understood that a system may use any classifiable concept as the basis of a dimension.

The multi-dimensional foraging interface may be generated on any appropriate device having a display, including computers, PDAs, phones or other appropriate data mechanism.

The design of the multi-dimensional interface includes the idea that exploratory information retrieval amounts to a conversation between the user and the retrieval system. In one embodiment, there are at least four main conversational acts or operations in the user's interactions with the system: (i) seeding, (ii) including sets of information (spiraling-out), (iii) excluding sets of information (spiraling-in), and (iv) peeking. In addition, there are commonly various secondary acts or operations for such things as (i) switching between panels and (ii) editing the constraints that are in effect.

Figure 5:
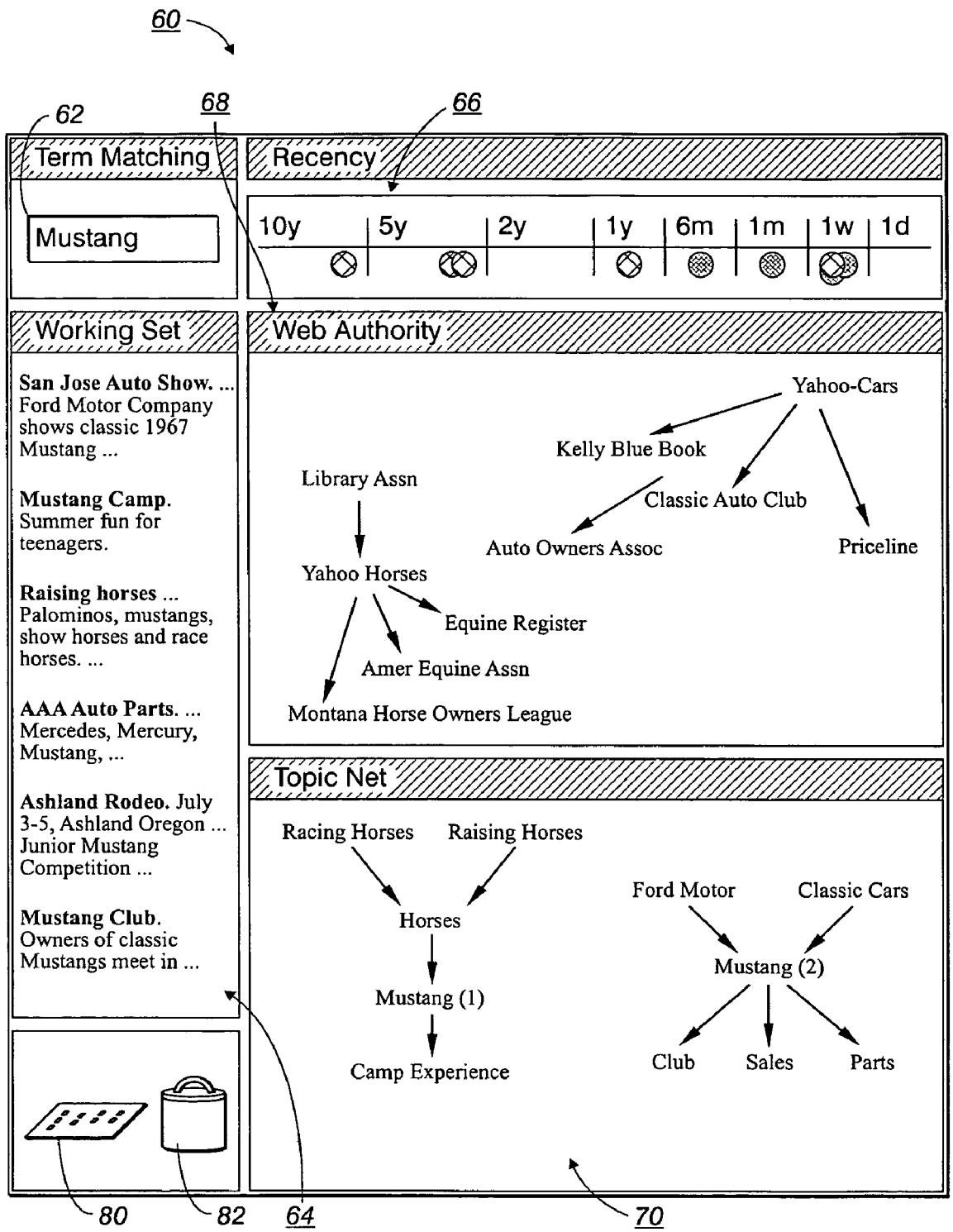
FIG. 5 illustrates a multi-dimensional interface display for an embodiment of the present application.

With continuing attention to FIG. 5, illustrated is one embodiment of a multi-dimensional interface display 60 for spiraling-in and spiraling-out. In this design, the original working set is obtained by entry of a search term in a search term matching block 62. A working set panel 64 displays representations of documents which are presently included within the active working set. The visualization provided in working set panel 64 permits a user to see titles and small descriptions of these documents which are currently included in the working set. The display of the working set documents may take different forms, including documents in a scrollable list, those ordered by some measure of relevancy or some degree of interest. The documents in working set panel 64 are for example organized hierarchically by topic, but may as well be organized in any other appropriate configuration.

Recency panel 66, Web Authority panel 68, and Topic Net panel 70 depict distinct dimensions by which document sets of the working set and neighbors are categorized.

Figure 6:
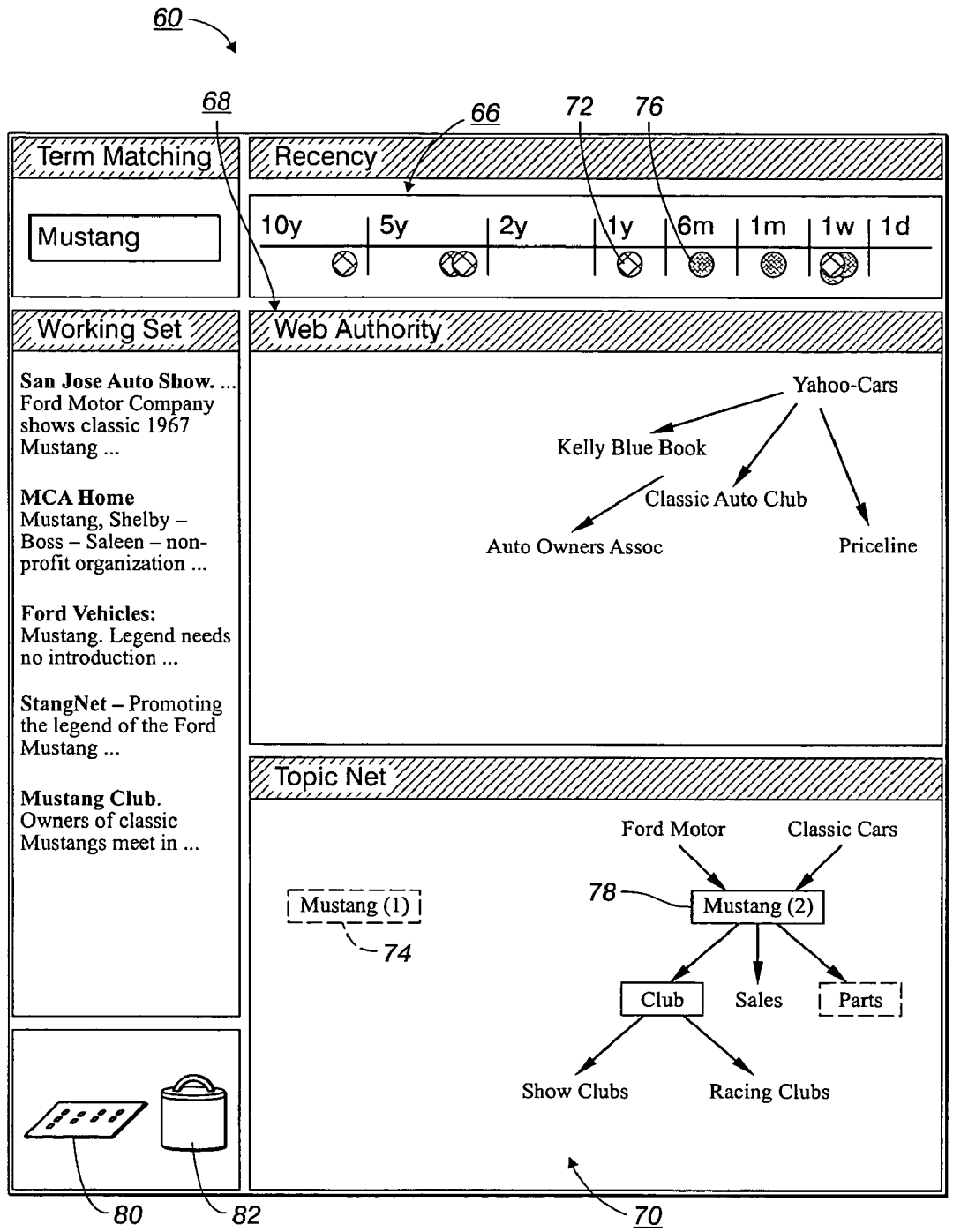
FIG. 6 depicts the multi-dimensional interface display of FIG. 4 upon which operations have been undertaken.

FIG. 6 shows the manner in which a retrieval boundary may be created through spiraling-in and spiraling-out, where the user adds inclusion constraints and exclusion constraints creating a boundary that specifies which documents are wanted and which are not. Each panel of the multi-dimensional retrieval system as shown by the interface 60, includes a vocabulary for excluding documents from a mixture according to their properties or dimensions such as "wrong genre", "wrong date", "wrong authors", "wrong reading level", "wrong sub-topic" and so on.

In FIGS. 5 and 6, the gray tokens 72 indicate document sets that are not included in the working set. If the user has explicitly indicated in a panel that the entire set corresponding to a token is always to be excluded from the working set, then the token is a boundary object and may have a box around it. For example, the boxed gray token Mustang (1) 74 represents an explicit exclusion constraint. Given this exclusion constraint in FIG. 6, documents about horses that were included in the working set of FIG. 5 are excluded in FIG. 6. Showing explicit exclusion constraints in the visualization reinforces the shared understanding between the system and the user about what information is to be filtered and the location of the retrieval boundary.

The multi-dimensional interface also provides leverage for spiraling-out. When users are spiraling-out, they are repeatedly asking the question "what information am I missing?" A key lever for answering this question during spiraling-out is the notion of neighbors—nearby documents in the universe of documents that the user may be interested in. The intuition here is that information foragers can easily understand extensions to a working set in terms of extensions at the fringe along some dimension. This is the concept of the earlier example of spiraling-out in a library, where the neighboring shelves contain books on nearby topics. Each panel in an multi dimensional foraging and retrieval system provides a vocabulary for selectively spiraling-out to related documents—neighboring subtopics, neighboring authors, and so on.

In FIG. 6, black tokens 76 indicate document sets that are completely included in the working set. Black panels with boxes around them indicate explicit inclusion constraints, Mustang (2) 78, where the user has indicated that documents in the set are all to be included. Showing explicit inclusion constraints in the visualization reflects the shared understanding between the user and the retrieval system and marks part of the boundary between what is wanted and what is not wanted.

Each dimension has a relation that associates documents and data values. The multi-dimensional foraging and retrieval system efficiently determines a dimension's data values (if known) for given documents, and conversely, identifies the documents that have a particular or matching data value for a given dimension.

Each panel has its own procedure for dividing documents into sets according to the property values for the corresponding dimension. In the simplest case, a document set is defined as the set of documents (usually in the working set and neighbors) that have the same value for the data associated with the dimension. For example, a document set in a genre dimension could be the set of all documents in the same genre. For some dimensions, the determination of which sets there are and which documents are in them can be more complex. For example, a topic hierarchy would sort documents into a tree of topics and subtopics where each node in the tree specializes the nodes above. Still another way to specify document sets is to group together documents whose values are in a given range. For example, documents written between one week and two weeks ago might be grouped together. In general, dimensions can support various kinds of intentional descriptions, which make it possible to decide which data values match which descriptions.

As previously noted, a panel provides a view of document sets in a particular dimension and shows how the working set is embedded in the corpus. Some panels are able to display different levels of a view of their document sets, by focusing in on particular portions of the retrieval boundary, or otherwise support browsing, zooming, panning, or scrolling.

A distance function may be associated with a dimension, which says how close different points are. For example, in a temporal dimension, the distance would be the time difference. In a topic dimension, it would be a measure of how far apart topics are. A degree-of-interest function (DOI) estimates how much interest something is to a user. DOI functions are often based on distance functions so that if a user is interested in an item A, he is likely to be interested more in other items that are "near" to A.

Each panel uses its own specific DOI function to determine which additional neighbors are of the greatest interest so that they can be represented visually in the panel. For example, the Topic Net panel shows sets of documents in the corpus that are about topics near the topics of documents in the working set. A panel based on a citation analysis would have a DOI function that computes a neighbor distance using factors such as amount of co-citation, co-mentioning of documents, and so on. Other panels indicating nearness in a social network might take into account co-authoring, common co-authors, common employer, common conferences of publication, and so on.

The retrieval boundary indicates which documents are wanted and which are not. There is only one retrieval boundary—the edge between the working set and the remainder of the corpus—but each panel provides a different basis or vocabulary for describing it. Each panel gives both a way of visualizing the document sets and also affordances for spiraling-in or out.

Portions of the retrieval boundary that are simple in terms of one dimension may be blurry in another. For example, a sharp boundary (black or gray token) in the topic dimension might appear as a blurry boundary (blue tokens) in a document recency dimension or a citation authority dimension. Having a multiplicity of dimensions gives users substantial distinct operations to narrow or expand the document sets. From the perspective of a user seeking particular information, some dimensions are more powerful than others at any given moment.

To operationalize the notion of a sharp or blurry boundary, consider that there is a token, token A, in dimension 1 representing a set of documents. In another dimension, dimension 2, a user has added an inclusion or exclusion constraint on some tokens. Those constraints create a sharp boundary in dimension 2. When all of the documents represented by token A are either included or excluded, the retrieval boundary is sharp in dimension 1. When some are included and some excluded, then the boundary is blurry relative to token A.

The design of the multi-dimensional interface includes the idea that exploratory information retrieval amounts to a conversation between the user and the retrieval system. In one embodiment, there are at least four main conversational acts or operations in the user's interactions with the system: (i) seeding, (ii) including sets of information (spiraling-out), (iii) excluding sets of information (spiraling-in), and (iv) peeking. In addition, there are commonly various secondary acts or operations for such things as (i) switching between panels and (ii) editing the constraints that are in effect.

Seeding amounts to gathering documents of potential interest from the corpus. When the user enters search terms in the term matching panel, this causes the retrieval system to search the corpus and to tentatively add the matching documents to the working set. Similarly, a user may select tokens in any of the panels and instruct the system to seed the working set with the corresponding sets of documents (i.e., documents). In this way, the working set is populated by extension—that is, by actively adding explicit sets of documents.

In the example in FIG. 5, seeding documents are added directly to the main working set by entry of search terms in term matching block 62. In variations of this user interface, seeding documents could be added to temporary working sets for examination (such as discussed in connection with FIG. 4), before merging, or replacing the main working set.

Fundamentally, a seeding operation indicates a provisional interest in a set of documents rather than an expression of definite interest or commitment to a retrieval boundary. Seeding is an exploratory act by which a user gathers documents for examination and further consideration.

As users continue, they make commitments about which information is of interest and which is not. In principle, these choices or retrieval constraints could include arbitrarily complex conditions. The interfaces in FIGS. 5 and 6 employ a simplifying assumption—the single token assumption—that it is sufficient in representing retrieval boundary objects to use positive and negative examples characterized by single tokens representing a document set in some dimension.

The single-token assumption enables a straightforward design for expressing a retrieval boundary using a direct manipulation interface. In the context of visualization, the retrieval boundary is represented by annotated tokens across multiple panels.

Conversational acts—in terms of seeding, inclusion constraints, and exclusion constraints—can be carried out by directly manipulating the tokens. In one embodiment a simple gesture for indicating a seeding operation is selecting, dragging, and dropping a token into a seeding zone 80 of FIGS. 5 and 6. A gesture for indicating an exclusion constraint is selecting, dragging and dropping a token into a visual trash container 82. Dropping a token into the working set 64 could indicate an inclusion constraint. The "log" of conversational events can be represented by visual annotations in the panels—such as an underline for a seeding event and a box for an inclusion or exclusion constraint.

To simplify user interactions, the retrieval system can enforce certain interaction conventions. For example, adding an inclusion constraint for a specific token might automatically imply a seeding event for the same token. It could also undo any prior exclusion constraints for the same token. For another example, exclusion actions on a specific token might override preceding seeding or inclusion actions on the same token. Visually, if a user adds an exclusion constraint for a token that was previously seeded, any prior seeding event or inclusion event for the same token could be deleted.

Because commitment operations are complex and can have widespread effects, it is useful to provide visual cues about effects when document sets are selected. When a user selects a set of documents in any of the panels, the selected objects are highlighted in all of the panels. Visualizations in the other panels are altered, e.g. are displayed in red if some members of their sets are included by the selection, and in addition they are "red-boxed" if all members of their sets are included. This highlighting operation supports peeking by giving users an immediate indication of the extent of their choices. This approach makes it possible to quickly visualize in other panels the documents selected in one panel.

The discussion about conversational acts in the user interface for multi-dimensional foraging and retrieval shows how recent conversational acts can override older ones. For example, performing a seeding or inclusion operation on a particular token may override (and eliminate) an exclusion constraint on the same token. However, such user interface policies do not disambiguate potential contradictions in boundary specifications. Thus, a given document might be covered by a seeding event by a token in one panel and at the same time be covered by an exclusion constraint in another. With reference to FIG. 6 and this concept, a web page for a club that trades auto parts might be covered by both the inclusion constraint for "Mustang Club" and the exclusion constraint for "Parts."

The apparent conflicts between exclusion constraints and inclusion constraints or seeding events can also arise across dimensions or in hierarchical relations. A Topic Net panel could be structured as a hierarchy of topics and subtopics. Documents belonging to a subtopic would also belong to the containing (super) topic, and potentially contradictory constraints could be expressed at any level.

It is necessary to address an evolving and potentially contradictory set of retrieval request and to determine whether the order that constraints are added be re-considered.

Figure 7:
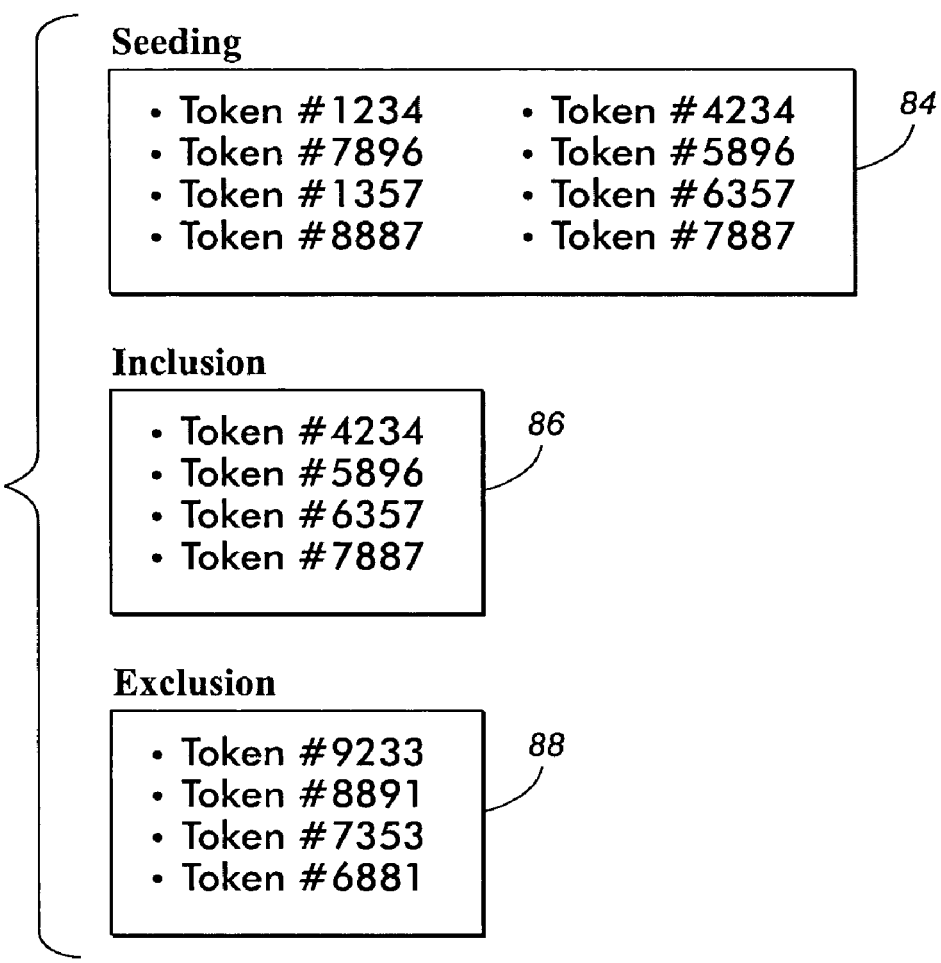
FIG. 7 depicts an embodiment of a process flow for interpreting a retrieval boundary.

Many approaches are possible for interpreting retrieval boundary specifications. One type of approach is illustrated in FIG. 7. Initially it is assumed the working set is empty. Seeding is governed by the union of all of the user's seeding requests (including the implicit seeding requests for all of the inclusion constraints) 84. Seeding events are interpreted as indicators of provisional interest. Next, all of the documents that match any of the explicit inclusion constraints are marked as committed 86. Finally, all documents that match any of the exclusion constraints are removed, except for documents that have been marked as committed 88.

This method of interpretation has the following useful aspects. It supports the interpretation that seeding events are tentative—subject to potential overriding by exclusion constraints. It makes it possible to mark some information or documents as committed, overriding exclusion constraints. It makes the decision of which documents to include or exclude be independent of the order in which the user adds constraints of any kind. The interpretation is as if all of the seeding operations were done first, then all of the inclusion operations, and finally all of the exclusion operations.

It may be noted at this point, that at the start of a foraging process, a working set may be developed by the mentioned seeding activity, including obtaining documents by entering search terms or directly adding documents (e.g., via selection of tokens). Alternatively, a foraging operation may begin by recalling a stored working set or retrieval boundary from a previous foraging operation. Also, foraging operations may begin with no documents in the working set, some documents in the working set, or all documents of the corpus in the workings set.

Concepts of embodiments of the present application are particularly relevant to the issue that the universe of documents is ever expanding. Information foragers track parts of this expanding universe, identifying new information and following the newest articles and latest developments. New information may also become available as the result of information processing on a corpus. For example, documents may be assigned additional topic labels as the users of a system or automatic processes identify new specialized clusters of meaning. Such computations could result in the discovery that some families of older documents, previously thought to be irrelevant, take on new interest. Computations running over time can yield insights incrementally.

The needs of information seekers also evolve. Although there are generally ongoing interests in the "information diets" of information foragers, there are also new and evolving interests. The new interests grow out of existing interests—as people build on what they know and explore new areas over time.

These factors foster a view of information as dynamic. The universe of documents is not like a large unchanging library. It accumulates new documents and older information can take on new life. It is as if there is a legion of information workers classifying documents and discovering new connections. At any time, an information worker may invent a new topic category or discover a new group of people working on similar problems but using different terminology. Even if there were no documents added to the library, there may be some "discovery" of interest to report.

This dynamic view of the nature of information has implications for the design of technology to support information seeking and sense making. In the context of multi-dimensional foraging and retrieval, one implication is that work done on expressing user's information interests—expressed as retrieval boundaries—is potentially worth saving and sharing.

Another implication is that the results of interpreting a retrieval boundary can evolve—both as new information is added to a corpus and as new information becomes available via the computations that derive dimensional data. This creates value for making it convenient to explore both what is new and what has changed. In other words, it becomes important to be able to identify documents that would be added or deleted as a consequence of new information or as a consequence in the computation of the dimensional data. One way to do this would be to save the "state" of a retrieval boundary as a combination of the specification in terms of its constraints, the contents of the working set, and potentially the dimensional data. Saving such information facilitates the identification of what has changed.

Finally, a third implication is that saved retrieval boundaries themselves are subject to revision in response to the increasing availability of dimensional data. As new topics or social groups or document sources become available, the author of a retrieval boundary may want to edit the boundary by revising the seeding events or changing the constraints. This creates potential value for technology that keeps track of the revisions of the boundary.

Figure 8:
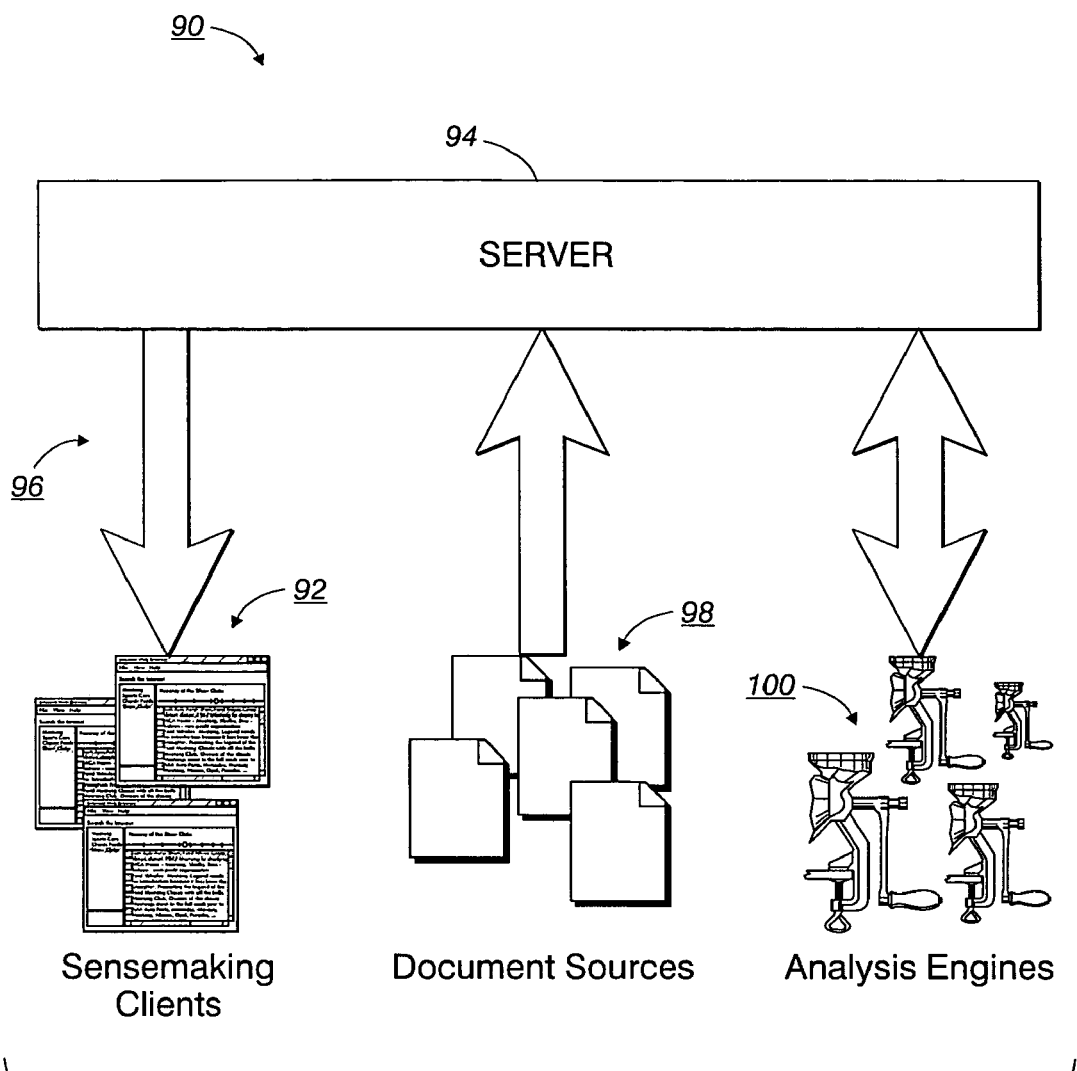
FIG. 8 illustrates an environment in which the present application is implemented.

The multi-dimensional foraging and retrieval system and method may function in a variety of environments. One embodiment is a client server configuration 90 such as shown in FIG. 8. In this design, clients 92 communicate with servers of a server system 94 via a communication channel 96. The servers store and/or have access to data such as found in document sources (e.g. patent databases, newswires, web crawlers, corporate network storage facilities, etc.) 98. Analysis engines (e.g. authoritativeness, topic classification, citation analysis, information extraction, etc.) 100 are used to work on the current working set of documents and document dimensions. Results of the analysis engine may be cached in a back-end repository, which may be part of analysis engine 100, or associated with a server of server system 94. Communication channel 96 may represent internet and/or other private or public data communication networks. The arrows of communication channel 96 indicate the main direction of information flow. However, it is to be understood information such as client requests are made to the communication channel.

For implementing any user interface involving dynamic queries, high speed is of great importance. According to standard practice in user interface design, reaction times to a search request should not exceed approximately 100 ms for a user interface to be perceived as responsive. In the context of a distributed multi-dimensional foraging and retrieval system, this goal is especially difficult to achieve: The dimensional data, which is needed for evaluating queries, can be expensive to calculate, and the channel between client and server can have low bandwidth or high latency.

To address the potentially slow speed of calculating dimensional data, analysis processes run concurrent to and independent of user interactions, and their findings are cached in a back-end repository. Therefore, the multi-dimensional foraging and retrieval system does not need to compute the values of document properties in real time.

To reduce the impact of their narrow communication channel to the server, clients employ techniques such as incremental display of arriving data. In addition, the communication protocol is designed to allow for prioritizing the information being transmitted and/or the initial transmission of overview information. Also, user gestures are implemented without any network communication. For example, if the client is able to execute exclusion constraints itself, the user interface for changing those constraints can be made highly responsive.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A multi-dimensional foraging method comprising:
    generating a working set of documents from a collection of documents having dimensions, wherein a dimension of a document represents a characteristic of the document;
    selecting panels, each panel corresponding to a selected dimension or combination of dimensions of the documents;
    generating for each of the selected panels, sets of the documents in the working set, the generated document sets corresponding to the dimension or combination of dimensions of a corresponding panel;
    generating neighboring document sets from documents other than those of the working set, the neighboring document sets related to the document sets generated from the working set;
    arranging the document sets having a particular dimension or combination of dimensions in relationship to each other in a same panel;
    selecting document sets to be included in the working set, wherein those not selected are placed in a non-working set;
    displaying a recency panel that presents documents within the working set and the non-working set on a time line, wherein the time line indicates a date of creation for each document presented;
    displaying the panels having the arranged document set on a visual display device, wherein a multi-dimensional view of the working set is provided;
    generating, within at least some of the panels, a visual retrieval boundary between document sets within the working set and document sets in the non-working set, wherein the visual retrieval boundary distinguishes between document sets within the working set and the non-working set;
    adding at least one of a visual constraint or inclusion to at least one of the displayed panels;
    altering the working set and the non-working set and the visual retrieval boundary based on the adding of the at least one visual constraint or inclusion; and
    displaying the panels with the altered working set and the non-working set and retrieval boundary.

2. The method as set forth in claim 1 further including saving the retrieval boundary.

3. The method as set forth in claim 2 further including running the saved retrieval boundary over an altered collection of documents.

4. The method as set forth in claim 1 wherein the document sets are represented by visual tokens.

5. The method as set forth in claim 1 wherein the retrieval boundary is generated incrementally.

6. The method as set forth in claim 1 wherein adding at least one of a constraint or inclusion to at least one of the displayed panels causes an altering of the working set.

7. The method as set forth in claim 1 further comprising altering the view of the multi-dimensional view of the working set by adding a constraint to spiral in, narrowing the number of documents being displayed or by adding an inclusion to spiral out, broadening the number of documents being displayed in at least one of the displayed panels, the adding of the constraint or the inclusion being controlled by a user.

8. The method as set forth in claim 7 wherein the adding of at least one of the constraint or inclusion in a first panel alters a view generated in another panel.

9. The method as set forth in claim 1 wherein the step of generating neighboring document sets includes performing at least one of a nearness operation or a degree of interest operation, from document sets generated from the working set.

10. In a data communication network a multi-dimensional foraging and retrieval system, comprising:
    a working set of documents generated from a collection of documents having dimensions, wherein a dimension of a document represents a characteristic of the document;
    a non-working set of documents comprised of the collection documents having dimensions that are outside the working set;
    a plurality of panels, each panel corresponding to a selected dimension or combination of dimensions of the documents, at least one panel is a recency panel that presents documents within the working set and the non-working set on a time line, wherein the time line indicates a date of creation for each document presented;
    a plurality of documents generated from the documents in the working set, the generated documents representative of the dimension or combination of dimensions for a corresponding panel;
    a plurality of neighboring document sets formed from documents other than the documents of the working set, the neighboring documents related to the documents generated from the working set; and
    a display for displaying multiple dimensions, including at least some of the plurality of panels having ones of the document sets, the document sets corresponding to the dimension or combination of dimensions of the respective panel, and the selected document sets arranged in a relationship to each other, wherein document sets within the working set and the non-working set are displayed, at least some of the panels having a visual retrieval boundary, the visual retrieval boundary distinguishes between document sets within the working set and document sets in the non-working set;
    adding at least one of a visual constraint or inclusion to at least one of the displayed panels;
    altering the working set and the non-working set and the visual retrieval boundary based on the adding of the at least one visual constraint or inclusion; and displaying the panels with the altered working set and the non-working set and retrieval boundary.

11. The data communication network according to claim 10 further including a client/server configuration wherein communication between the client and server employs a communications protocol that supports computations based on incremental communication of search results.

12. The data communication network according to claim 11 wherein the protocol includes a prioritizing communications protocol which prioritizes communications to first communicate results within the working set.

13. The data communication network according to claim 11 wherein the protocol includes a summarizing communications protocol which summarizes or provides approximations of results prior to communicating details of the results.

14. The data communication network according to claim 10 further including an analysis process configured to run concurrent with and independent of operation of the system by a user, and wherein findings of the analysis process are cached in a back-end repository.

15. The method as set forth in claim 1, wherein computing of dimensional data occurs while a foraging operation is occurring.

16. The method as set forth in claim 1, further including,
altering, tentatively, during the foraging operation a composition of the working set of documents by either adding or eliminating documents having a particular value in at least one dimension,
wherein the altering step alters at least one of the multiple views of the documents, within the panels.

17. A multi-dimensional foraging method comprising:
generating a working set of documents from a collection of documents having dimensions as part of a document foraging and retrieving operation, wherein a dimension of a document represents a characteristic of the document;
selecting panels, each panel corresponding to a selected dimension or combination of dimensions of the documents obtained as part of the document and retrieving operation;
generating for each of the selected panels, sets of the documents in the working set, the generated document sets corresponding to the dimension or combination of dimensions of a corresponding panel;
generating neighboring document sets from documents other than those of the working set, the neighboring document sets related to the document sets generated from the working set;
arranging the document sets having a particular dimension or combination of dimensions in relationship to each other in a same panel;
selecting document sets to be included in the working set, wherein those not selected are placed in a non-working set;
displaying a recency panel that presents documents within the working set and the non-working set on a time line, wherein the time line indicates a date of creation for each document presented;
displaying the panels having the arranged document set on a visual display device, wherein a multi-dimensional view of the working set is provided, wherein the displaying includes generating within at least some of the panels a visual retrieval boundary between document sets within the working set and document sets in the non-working set, wherein the visual retrieval boundary distinguishes between document sets within the working set and document sets in the non-working set;
adding at least one of a visual constraint or inclusion to at least one of the displayed panels;
altering the working set and the non-working set and the visual retrieval boundary based on the adding of the at least one visual constraint or inclusion; and
displaying the panels with the altered working set and the non-working set and retrieval boundary.

18. The method according to claim 17, wherein the selected dimension or combination of dimensions includes a document genre dimension.

19. The method according to claim 17, wherein the selected dimension or combination of dimensions includes a level of reading difficulty dimension.

20. The method according to claim 17, wherein the selected dimension or combination of dimensions includes a popularity dimension.

21. The method according to claim 17, wherein the selected dimension or combination of dimensions includes a community of authorship dimension.

22. The method according to claim 17, wherein the selected dimension or combination of dimensions includes a topic dimension.

23. The method according to claim 17, wherein the selected dimension or combination of dimensions includes meta-data.

24. The method as set forth in claim 17 wherein the adding of at least one of the constraint or inclusion in a first panel alters a view generated in another panel.

* * * * *